United States Patent [19]

Grob et al.

[11] Patent Number: 5,739,417
[45] Date of Patent: Apr. 14, 1998

[54] METHOD AND DEVICE FOR DETERMINING OPERATING PARAMETERS IN AN INTERNAL COMBUSTION ENGINE

[75] Inventors: Ferdinand Grob, Besigheim; Uwe Reuter; Uwe Maienberg, both of Stuttgart; Klaus Scherrbacher, Schwieberdingen, all of Germany

[73] Assignee: Robert Bosch GmbH, Stuttgart, Germany

[21] Appl. No.: 700,903

[22] Filed: Aug. 21, 1996

[30] Foreign Application Priority Data

Sep. 28, 1995 [DE] Germany ............ 195 36 110.5

[51] Int. Cl.$^6$ ............ G01L 23/22; G01N 25/20; G01N 33/22
[52] U.S. Cl. ............ 73/35.03; 73/117.2; 73/119 A
[58] Field of Search ............ 73/35.03, 35.04, 73/117.2, 117.3, 119 A

[56] References Cited

U.S. PATENT DOCUMENTS

| | | | |
|---|---|---|---|
| 4,345,558 | 8/1982 | Yamaguchi et al. | 73/35.03 |
| 4,364,260 | 12/1982 | Chen et al. | 73/35.03 |
| 4,467,634 | 8/1984 | Rohde et al. | |
| 4,637,245 | 1/1987 | Iwata et al. | 73/35.03 |
| 5,119,783 | 6/1992 | Komurasaki | 123/425 |
| 5,205,258 | 4/1993 | Hashimoto et al. | 73/35.05 |
| 5,400,644 | 3/1995 | Remboski, Jr. et al. | 73/35.04 |

FOREIGN PATENT DOCUMENTS 1065715  1/1984  U.S.S.R.

*Primary Examiner*—George M. Dombroske
*Assistant Examiner*—Max H. Noori
*Attorney, Agent, or Firm*—Kenyon & Kenyon

[57] ABSTRACT

A method and a device for controlling an internal combustion engine, in particular a diesel gasoline engine. The output signal from at least one structure-borne noise sensor is supplied to at least one first and one second filter means, which exhibit different response characteristics. On the basis of the output signals from the filmer means, at least two quantities that characterize the combustion and/or the injection in the internal combustion engine are able to be determined.

11 Claims, 6 Drawing Sheets

METHOD AND DEVICE FOR DETERMINING OPERATING PARAMETERS IN AN INTERNAL COMBUSTION ENGINE

BACKGROUND INFORMATION

German Patent Application No. 31 33 703 (corresponding to U.S. Pat. No. 4,467,634) describes a method and a device for controlling an internal combustion engine, which comprises at least one structure-borne noise sensor. The output signal from the structure-borne noise sensor is supplied to two filters, the output of one of the filters being used for the useful signal and the output of the other filter for detecting spurious (stray interference) signals.

With this device, one is merely able to recognize whether knocking noises caused by an inadequate (uncontrolled) combustion are occurring in the internal combustion engine. Operating parameters, such as start-of-injection, end-of-injection, start of pump delivery, end of pump delivery, and start of combustion, are not able to be determined with this procedure.

SUMMARY OF THE INVENTION

An object of the present invention is to determine the various operating parameters of the internal combustion engine using the structure-borne noise sensor. The procedure according to the present invention makes it possible, using a relatively simple sensor, to determine various operating parameters, such as start-of-injection, end-of-injection, start of pump delivery, end of pump delivery, and start of combustion, and other quantities derived from these quantities.

DETAILED DESCRIPTION

When working with diesel engines, the start-of-injection, start of pump delivery, or the start of combustion represent important characteristic quantities that relate to combustion. To optimize the efficiency of the engine and to minimize pollutant emission and noise generation, it is necessary for the start of injection required for the particular operating state of the internal combustion engine and the resulting start of combustion to be observed very precisely.

Generally, one does not succeed with such a precise observation with a purely open-loop control of the start of injection. Therefore, the opening of the injection nozzle needle is measured in known systems for one cylinder of the internal combustion engine using a so-called needle-motion sensor in the injection nozzle holder. From this, the sought after start of injection can be determined for this cylinder. Tolerances of the start of injection specific to the individual cylinders cannot be detected by this means for the remaining cylinders. For this purpose, one needle-motion sensor would be required per cylinder, which would entail a correspondingly high outlay.

The method described in the following makes it possible to detect a start of injection and/or start of combustion specific to an individual cylinder using only one structure-borne noise sensor mounted externally on the engine. This results in considerable cost advantages and functional advantages over systems known under the state of the art.

Figure 1:
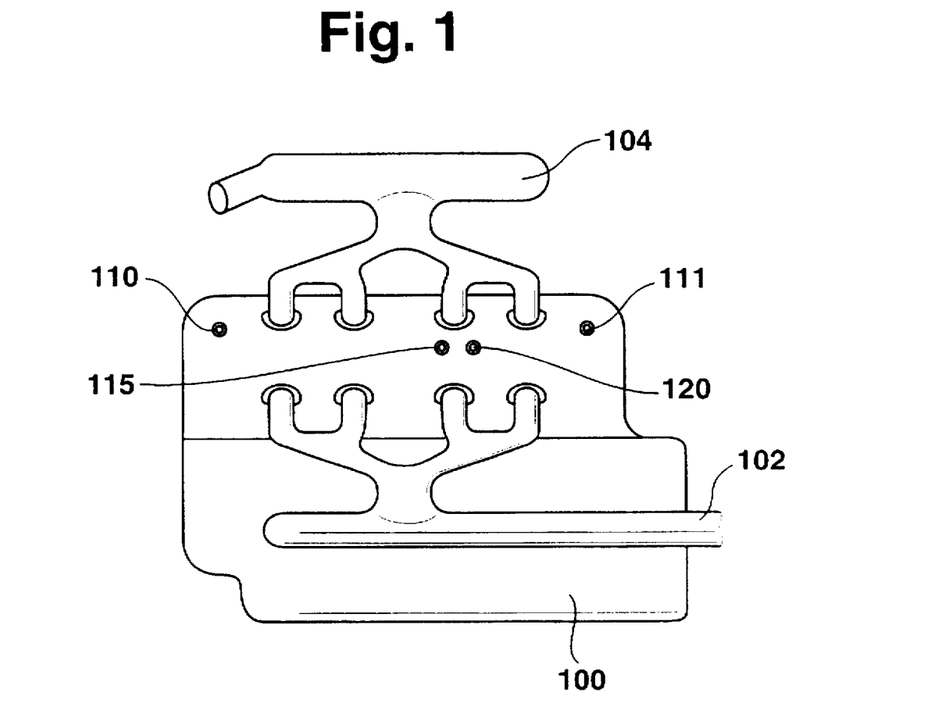
FIG. 1 shows a diesel gasoline engine having two structure-borne noise sensors.
Figure 2:
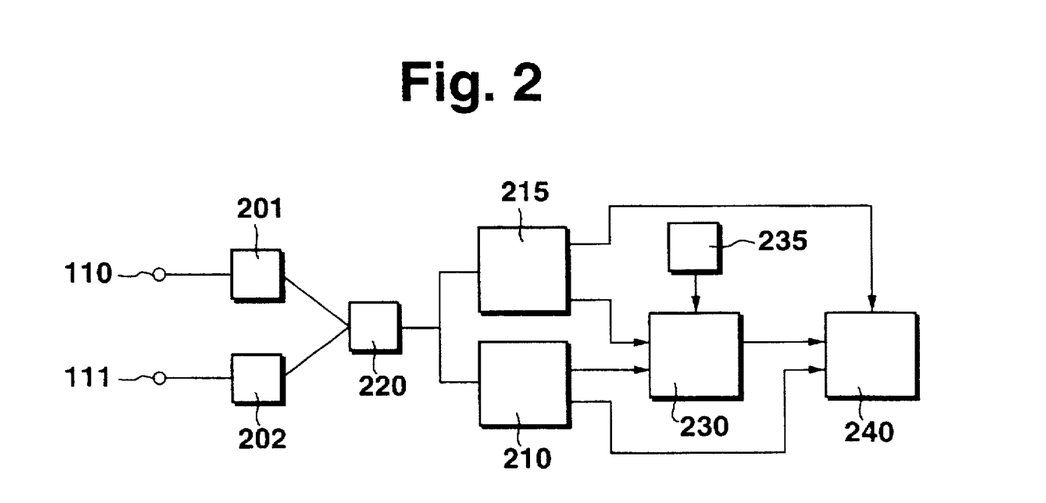
FIG. 2 shows a block diagram of the two knock sensors.
Figure 3A:
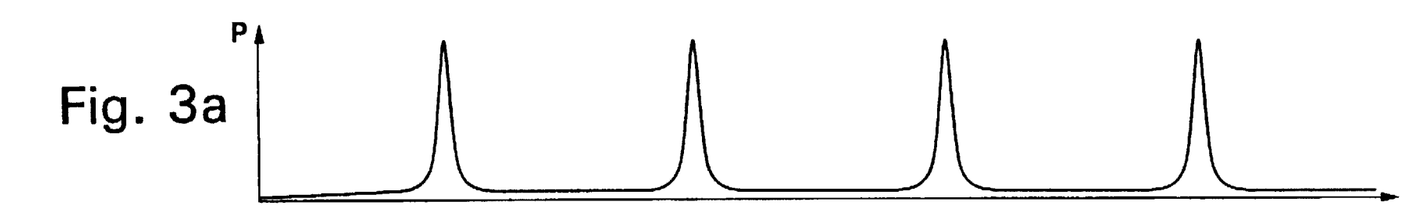
FIG. 3 shows typical sensor signals of the knock sensors plotted over four combustion operations.
Figure 3B:
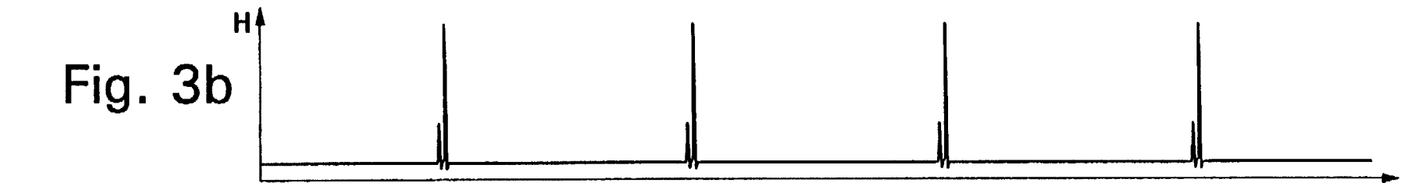
Figure 3C:
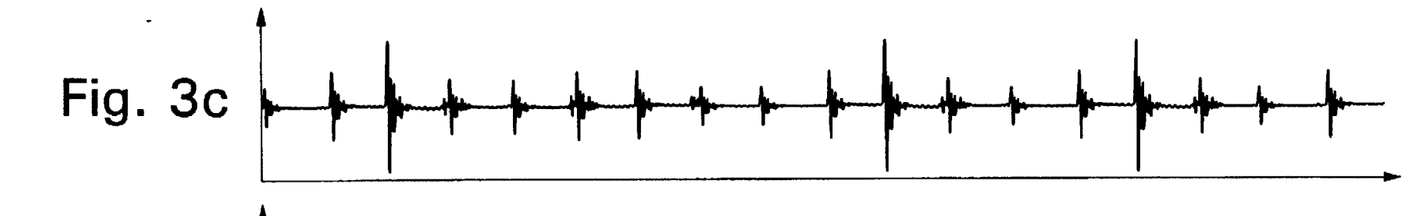
Figure 3D:
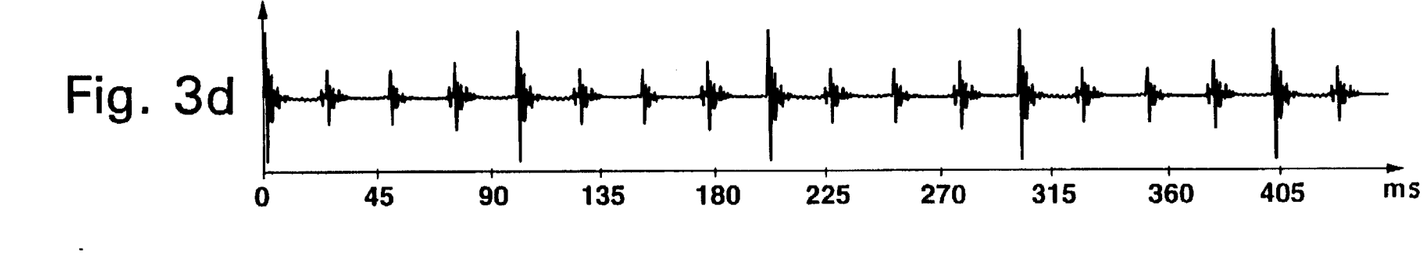
Figure 4A:
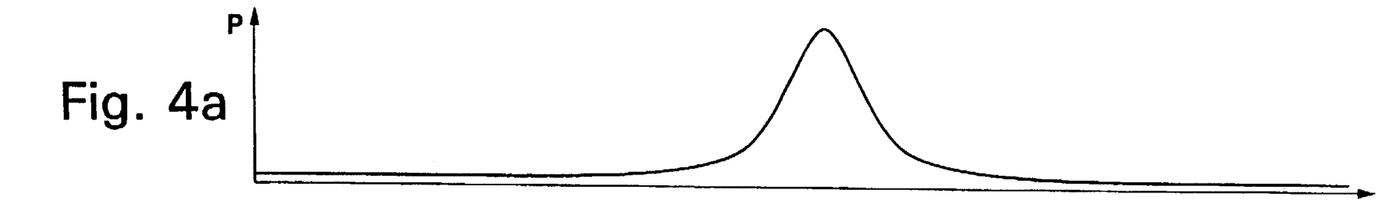
FIG. 4 shows the signals over one combustion operation.
Figure 4B:
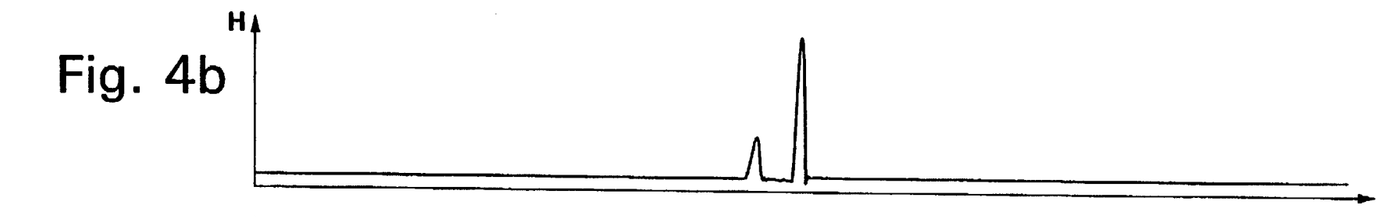
Figure 4C:
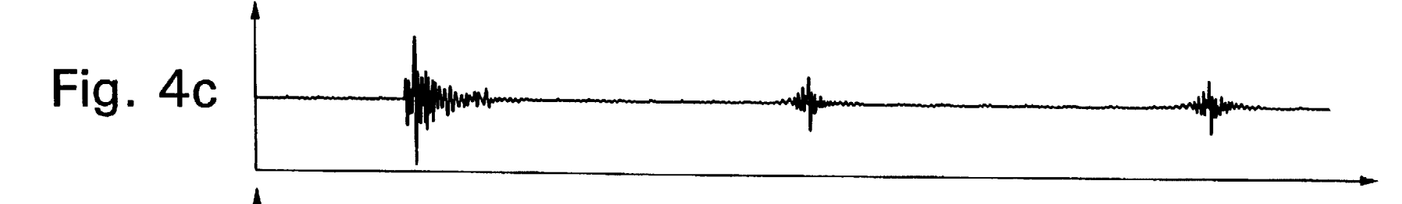
Figure 4D:
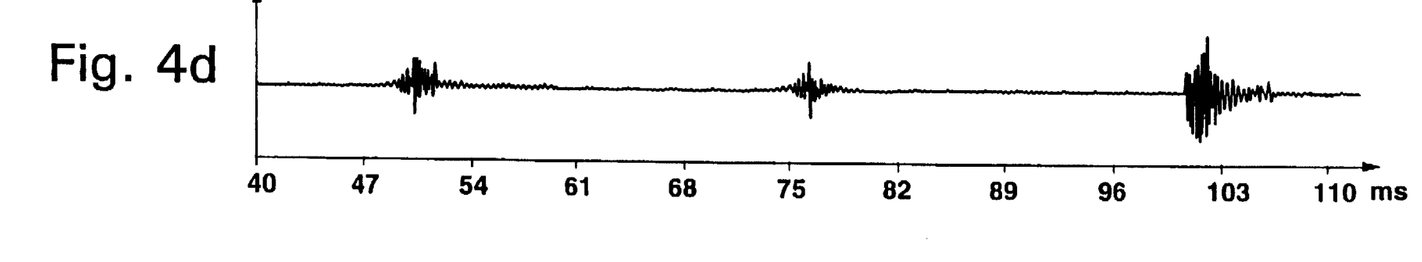

FIG. 1 schematically depicts a 4-cylinder diesel gasoline engine having two acoustically conductive structure-borne noise sensors 110 and 111 mounted on the engine. A needle-motion sensor is designated by 115 and a cylinder-pressure sensor by 120. 104 denotes the fresh-air pipes and 102 the exhaust pipes. In FIG. 2, the signal evaluation is illustrated as a block diagram for the two knock sensors 110 and 111. Via a propagation-delay correction 201, the output signal from the first knock sensor 110 attains a cylinder selection 220. Correspondingly, via a second propagation-delay correction 202, the output signal from the second knock sensor 111 attains a cylinder selection 220.

The signal arrives from the cylinder selection unit 220 at a first band-pass filter 210 and at a second band-pass filter 215. The output signals of the band-pass filters arrive at a signal-processing unit 230, which, in turn, applies signals to an engine timing unit 240. Furthermore, output signals from the band-pass filters 210 and 215 arrive directly at the engine timing unit 240. In addition, the signal processing unit 230 processes signals from various sensors 235.

This device functions in the following manner: the propagation delay of the various signals from a signal source to the various knock sensors 110 and 111 varies. This propagation delay is compensated by the propagation-delay correction units 201 and 202. On the basis of the signal level height, which depends, in turn, on the distance between the signal source and the sensor, the cylinder-recognition unit assigns the signal to a specific sensor. By this means, the detected signal can be correlated to the corresponding cylinder.

In principle, the procedure described in the following can also be carried out using a structure-borne noise sensor. By using two or more structure-borne noise sensors, the signal quality can be substantially improved. It is especially advantageous when the structure-borne noise sensors are arranged at spatially different mounting sites on the engine. By adding the propagation-delay-corrected signals, the useful signal can be substantially increased (intensified) in comparison to spurious signals. Furthermore, by using a plurality of sensors, the failure of individual sensors can be recognized through a signal comparison.

It is provided in accordance with the present invention for the first band-pass filter to have edge (cut-off corner) frequencies of 10 kHz and 30 kHz. The second band-pass filter 215 has edge frequencies of 500 kHz and 4 kHz. These frequency values only represent guidance values and can vary depending on the type of internal combustion engine.

The band-pass filters filter the output signals from the knock sensors 110 or 111. On the basis of the filtered signals, the signal processing determines various quantities which characterize the injection or the combustion. The thus obtained signals are used by the engine timing unit to control the internal combustion engine in open-loop and closed-loop.

In FIG. 3, typical sensor signals of the knock sensors are plotted over four combustion operations of one cylinder, i.e., over an arc of crankshaft rotation of 4°*720°. The cylinder pressure P of the one cylinder is plotted in FIG. 3a, the injection nozzle needle lift H of the one cylinder in the partial FIG. 3b, the output signal of the first structure-borne noise sensor in the partial FIG. 3c, and the output signal of the second structure-borne noise sensor in the partial FIG. 3d.

In this case, the position of the first structure-borne noise sensor lies in the vicinity of cylinder 1, and the second structure-borne noise sensor in the vicinity of cylinder 4.

In FIG. 4, the corresponding signals are illustrated extended over the time of one combustion operation. During the rise of the pressure characteristic pattern in the cylinder, the needle-motion sensor first moves with little intensity. After a short delay, the second rise in the needle-motion sensor signal follows. The first rise can be attributed to a preliminary injection.

At the same time that the first signal appears, the amplitude of the structure-borne noise sensors increases. When the second rise in the needle-motion sensor occurs shortly before the maximum cylinder pressure is reached, the amplitude of the structure-borne noise sensor rises abruptly.

Figure 5A:
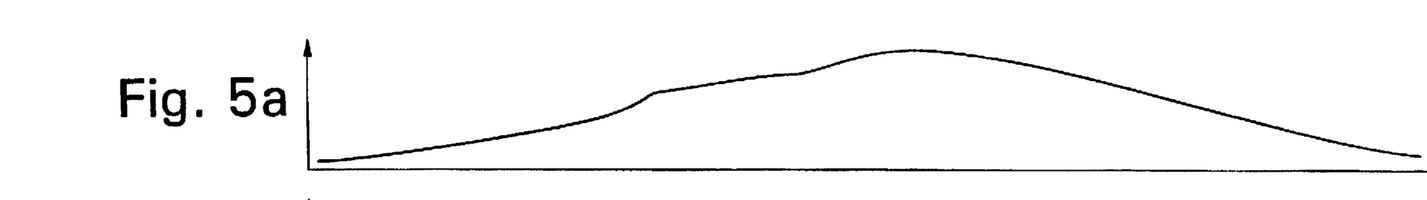
FIG. 5 shows various signals plotted over time.
Figure 5B:
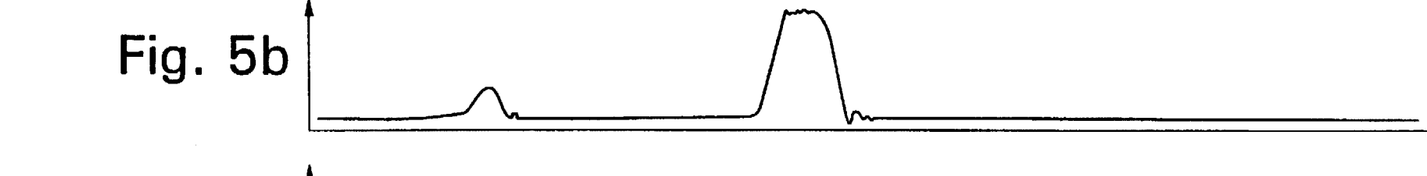
Figure 5C:
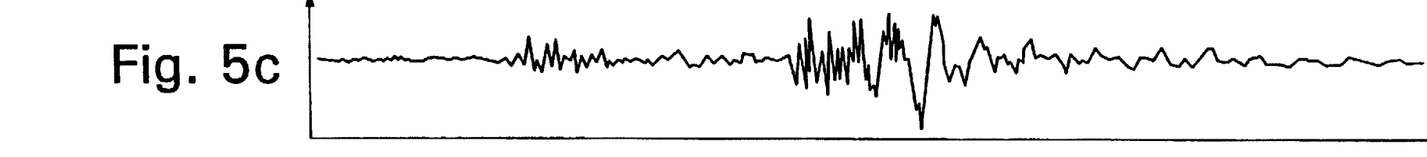
Figure 5D:
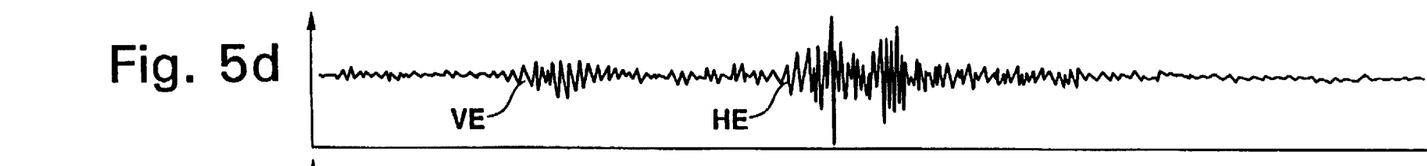
Figure 5E:
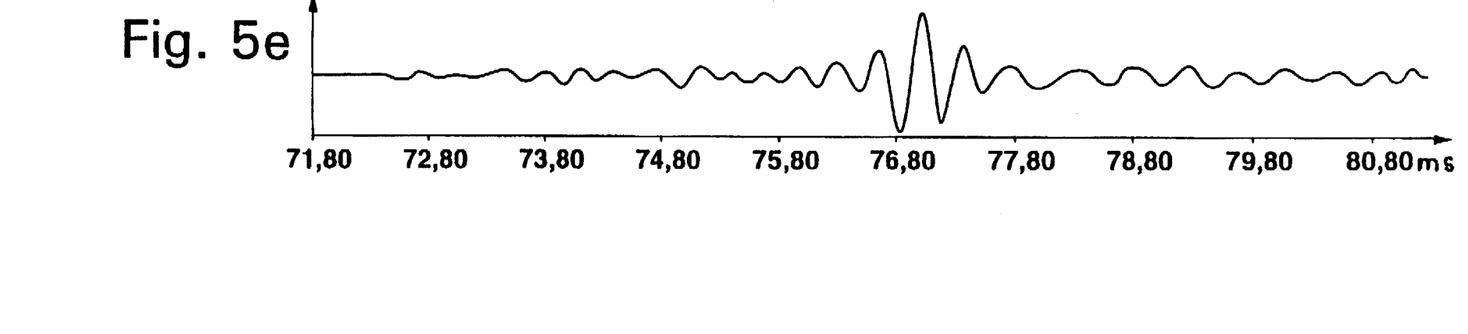

Plotted over time, in turn, in FIG. 5a is the cylinder pressure; in FIG. 5b the output signal from the needle-motion sensor; in FIG. 5c the output signal from one of the knock sensors; in FIG. 5d the output signal from the first and in FIG. 5e the output signal from the second band-pass filter. Generally, the valve needle does not open up to the upper limit stop in response to the small quantities for the preliminary injection.

In response to the preliminary injection, merely the needle hitting against the lower limit stop is discernible at the end of the injection operation. At this instant, the amplitude of the output signal of the knock sensor rises. At this instant, the high-frequency components of the output signal of the knock sensor increase. This instant is denoted by VE.

In response to the main injection, the needle of the needle-motion sensor moves up to the upper limit stop. At this instant, the amplitude of the output signal of the knock sensor likewise rises and therewith, in particular, the high-frequency components. This instant is denoted by HE.

The start of the main injection is recognized when the needle moves, when opening, up to the upper limit stop. This instant is recognized when the output signal of the first band-pass filter rises above a first threshold value.

The start of combustion is recognized on the basis of the output signal from the second band-pass filter, i.e., on the basis of the low-frequency components of the signal. The start of combustion is recognized when the output signal from the second band-pass filter exceeds a threshold value.

Figure 6:
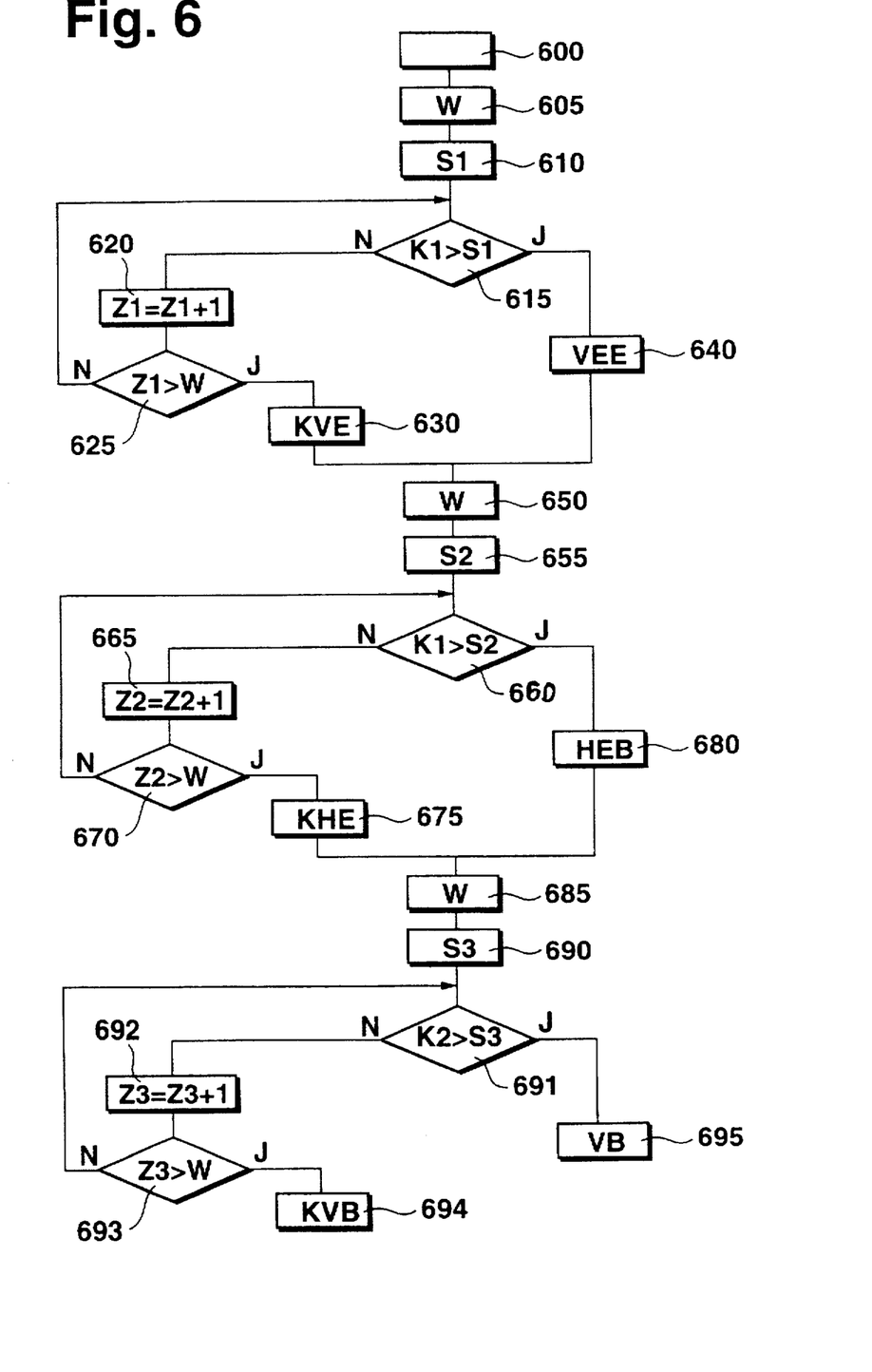
FIG. 6 shows a flow chart of how various signals are detected.

How the various signals are detected is elucidated in the following on the basis of the flow chart of FIG. 6. The program starts in a first step 600. Here, all meter readings are reset to zero. In step 605, a first value W for the time meter Z1 is determined as a function of various operating conditions. This value indicates the time span within which a preliminary injection usually takes place. The threshold value S1 is specified in the following step 610. This threshold value specification preferably follows as a function of the amplitude of the signal of the knock sensor.

The query 615 checks whether the output signal K1 of the first band-pass filter is greater than the threshold value S1. If this is not the case, the meter Z1 is incremented (advanced) by one in step 620. The subsequent query 625 checks whether the meter Z1 is greater than the value W. If this is not the case, this means that the time span within which the preliminary injection usually follows has not yet elapsed, so that the query 615 follows once again. If the query 625 recognizes that the time span within which a preliminary injection should usually follow has elapsed, it is recognized in step 630 that no preliminary injection took place. To this end, a memory KVE is set to a predetermined value. If the query 615 recognizes that the output signal K1 is greater than the threshold value S1, the instant of the end of the preliminary injection is stored in the memory VEE in step 640.

Following steps 630 or 640, the value W is newly determined in step 650. This value W indicates within which time span the start of the main injection occurs. The threshold value S2 is subsequently determined in step 655.

The query 660 checks whether the output signal of the first band-pass filter K1 is greater than the second threshold value. If this is not the case, a second meter Z2 is incremented by one in step 665. Query 670 checks whether the value Z2 is greater than the value W. If this is not the case, i.e., the time span within which the main injection is supposed to begin has not yet elapsed, then the query 660 follows anew. If this is the case, i.e., the time span has elapsed, it is then recognized in step 675 that no main injection took place, i.e., the memory KHE, which indicates that no main injection took place, is set. If the query 660 recognizes that the output signal K1 of the first band-pass filter is greater than a threshold value S2, the start of the main injection is recognized in step 680, and the instant HEB of the start of the main injection is stored.

Following steps 675 or 680, the value W is recalculated in step 685. The threshold value S3 is subsequently determined in step 690. The subsequent query 691 checks whether the output signal of the second band-pass filter is greater than the threshold value S3. If this is not the case, the meter Z3 is incremented by one in step 692. The subsequent query 693 checks whether the meter reading Z3 is greater than the value W. If this is not the case, i.e., the time span within which the start of combustion is supposed to take place following the detected start of injection, has not yet elapsed, then the query 691 follows anew. If the query 693 recognizes that the time span has already elapsed, it is recognized in step 694 that no start of combustion has taken place, i.e., the memory KVB is set accordingly. If the query 691 recognizes that the output signal K2 of the second band-pass filter is greater than the threshold value, the start of combustion is recognized in step 695, and the instant VB of the start of combustion is stored.

This program is run through once for every combustion operation. It is particularly advantageous when the above program is executed in parallel. This means that steps 605 through 640, steps 650 through 680, and steps 685 through 695 each constitute one operation and are executed simultaneously.

Figure 7:
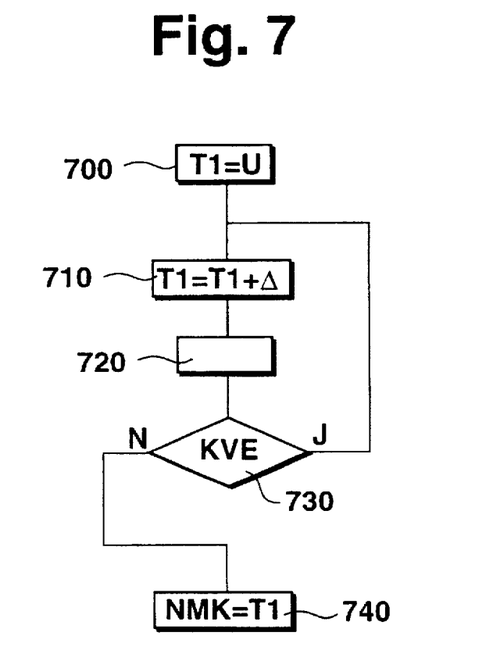
FIG. 7 shows a flow chart of a calibration method.

A zero-quantity calibration method is described on the basis of a flow chart in FIG. 7. In a first step 700, a drive period (trigger duration) for the injector T1 is set to zero. This drive period T1 determines the metering period of the preliminary injection. In the subsequent step 710, this drive period T1 is increased by a predetermined value Δ. The fuel metering into the corresponding cylinders follows in step 720. The query 730 subsequently checks whether the memory KVE indicates if a preliminary injection took place or not. If no preliminary injection took place, step 710 follows anew. If the memory KVE is occupied so as to indicate that a preliminary injection took place, the zero-quantity calibration value NMK value is set to T1 in step 740.

This zero-quantity value is especially important when working with solenoid-valve-controlled injection systems, since the preliminary injection quantities that occur in such systems are comparatively small. It indicates the electrical drive period for the solenoid valve required for the injection nozzle needle to just open. The NMK value is determined in that the drive period T1 of the solenoid valve for the preliminary injections is incremented in small steps until the end of the preliminary injection is recognized for the first time.

The difference between the electrical drive period and the NMK value determined for this working point yields the injection period for the preliminary injection.

Other characteristic quantities of the internal combustion engine are able to be determined from the combination of the characteristic values of the high- and low-frequency band-pass filter.

If the memory HEB indicates, for example, that an injection is at hand, and the signal VB indicates at the same time that no combustion took place, then a combustion miss has occurred. This signal is especially important for diagnostic purposes, e.g., in conjunction with OBD2 (on-board diagnostic system).

The time interval between the start of injection HEB and the point of ignition or the start of combustion VB is a measure of the ignition delay.

If the start of combustion is recognized before the point of ignition, then in the case of Otto (spark ignition) engines, one speaks of a surface ignition. If the start of combustion VB lies before the start of injection HEB, the pre-injected quantity was so great that a substantial combustion already took place there.

If it is recognized that the time period between the start and end of injection is longer than an expected value or that the end of injection is not recognized, a prolonged injection is recognized because the injector did not properly end the injection. When working with so-called common-rail systems, a defectively faulty injector can be detected by performing an appropriate evaluation.

Figure 8:
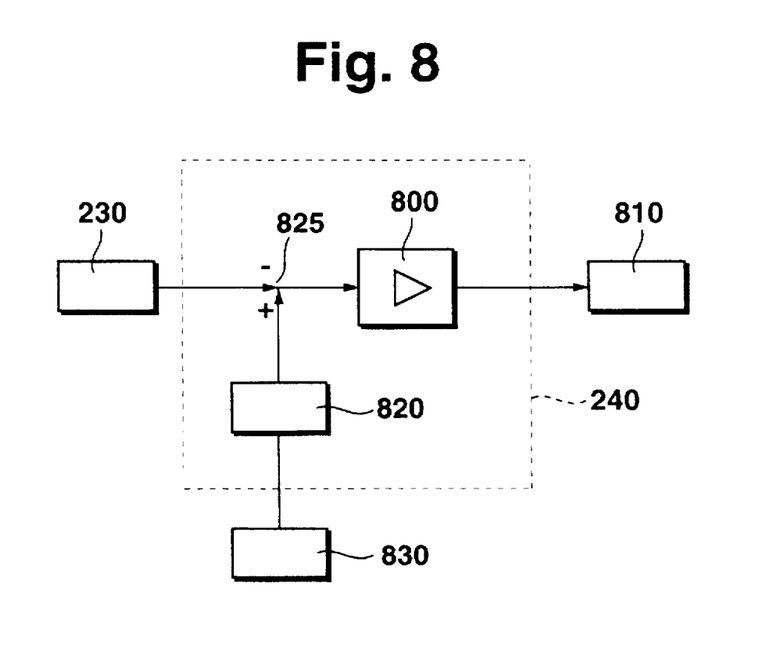
FIG. 8 shows a block diagram illustrating closed-loop control.

It is especially advantageous when the control 240 is conceived as a closed-loop control. This improved specific embodiment is shown in FIG. 8. The output signal from the signal processing arrives with a negative operational sign at a node 825. The node applies a signal to an automatic controller 800. The automatic controller 800 makes available a driving signal for an actuator 810. The output signal from a setpoint selection unit 820, which receives signals from various sensors 830, is applied with a positive operational sign to the second input of the node 825.

On the basis of various sensor signals, the setpoint selection unit 820 determines a setpoint value for a quantity that characterizes the combustion or the injection. This is, for example, the start of combustion and/or the start of injection. This determined quantity arrives as a setpoint value at the node 825. In the node, this setpoint value is compared to the actual value, which is held ready by the signal evaluation 230.

In dependence upon the result of the comparison, the automatic controller 800 determines a driving signal for the actuator 810.

What is claimed is:

1. A method for controlling an internal combustion engine, comprising the steps of:

supplying a sensor output signal from a sensor to first and second filters, the sensor including at least one of a structure-borne noise sensor and a knock sensor, the first and second filters exhibiting different response characteristics;

determining at least two values corresponding to at least one of a combustion parameter and an injection parameter of the engine as a function of first and second output signals from the first and second filters, respectively; and determining a control value indicative of a time when at least one of a first value of the first output signal and a second value of the second output signal exceeds a predetermined threshold value, the engine being controlled as a function of the control value.

2. The method according to claim 1, wherein the engine is a diesel gasoline engine.

3. The method according to claim 1, further comprising the step of evaluating the first output signal to characterize the injection.

4. The method according to claim 1, further comprising the step of evaluating the second output signal to characterize the combustion.

5. A method for controlling an internal combustion engine, comprising the steps of:

supplying a sensor output signal from a sensor to first and second filters, the sensor including at least one of a structure-borne noise sensor and a knock sensor, the first and second filters exhibiting different response characteristics;

determining at least two values corresponding to at least one of a combustion parameter and an injection parameter of the engine as a function of first and second output signals from the first and second filters, respectively; and deriving a signal indicative of at least one of a start of injection and an end of injection as a function of the first output signal.

6. A method for controlling an internal combustion engine, comprising the steps of:

supplying a sensor output signal from a sensor to first and second filters, the sensor including at least one of a structure-borne noise sensor and a knock sensor, the first and second filters exhibiting different response characteristics;

determining at least two values corresponding to at least one of a combustion parameter and an injection parameter of the engine as a function of first and second output signals from the first and second filters, respectively; and deriving a signal indicative of a start of combustion as a function of the second output signal.

7. The method according to claim 1, further comprising the step of using the signals for at least one of diagnostics and closed-loop control of the engine.

8. A device for controlling an internal combustion engine, comprising:

at least one structure-borne noise sensor providing a sensor output signal;

first and second filters receiving the sensor output signal and providing first and second output signals, respectively, the first and second filters exhibiting different response characteristics; and a control unit determining at least two values corresponding to at least one of a combustion parameter and an injection parameter of the engine as a function of the first and second output signals, wherein the control unit determine a control value indicative of a time when at least one of a first value of the first output signal and a second value of the second output signal exceeds a predetermined threshold value, the engine being controlled as a function of the control value.

9. The device according to claim 8, wherein the engine is a diesel gasoline engine.

10. A method for controlling an internal combustion engine, comprising the steps of:

supplying a sensor output signal from a sensor to first and second filters, the sensor including at least one of a structure-borne noise sensor and a knock sensor, the first and second filters exhibiting different response characteristics and generating first and second output signals, respectively;

determining a first operating signal indicative of at least one of a start time of injection and an end time of injection as a function of the first output signal; and determining a second operating signal indicative of a start time of combustion as a function of the second output signal.

11. A device for controlling an internal combustion engine, comprising:

at least one structure-borne noise sensor providing a sensor output signal;

first and second filters receiving the sensor output signal and providing first and second output signals, respectively, the first and second filters exhibiting different response characteristics; and a control unit determining a first operating signal indicative of at least one of a start time of injection and an end time of injection as a function of the first output signal, the control unit determining a second operating signal indicative of a start time of combustion as a function of the second output signal, the control unit controlling the engine as a function of the first and second operating signals.

* * * * *